United States Patent
Boxley et al.

(10) Patent No.: US 8,859,141 B2
(45) Date of Patent: Oct. 14, 2014

(54) SOLID-STATE SODIUM-BASED SECONDARY CELL HAVING A SODIUM ION CONDUCTIVE CERAMIC SEPARATOR

(75) Inventors: Chett Boxley, Park City, UT (US); W. Grover Coors, San Diego, CA (US); John Joseph Watkins, West Jordan, UT (US)

(73) Assignee: Ceramatec, Inc., Salt Lake City, UT (US)

( * ) Notice: Subject to any disclaimer, the term of this patent is extended or adjusted under 35 U.S.C. 154(b) by 687 days.

(21) Appl. No.: 12/940,864

(22) Filed: Nov. 5, 2010

(65) Prior Publication Data
US 2011/0104526 A1    May 5, 2011

Related U.S. Application Data

(60) Provisional application No. 61/258,563, filed on Nov. 5, 2009.

(51) Int. Cl.
| | |
|---|---|
| *H01M 4/02* | (2006.01) |
| *H01M 2/16* | (2006.01) |
| *H01M 10/056* | (2010.01) |
| *H01M 10/39* | (2006.01) |
| *H01M 10/05* | (2010.01) |

(52) U.S. Cl.
CPC ............ *H01M 10/05* (2013.01); *H01M 2/1646* (2013.01); *H01M 10/056* (2013.01); *Y02E 60/12* (2013.01); *H01M 10/3909* (2013.01); *H01M 10/3918* (2013.01)
USPC ....................................... 429/209

(58) Field of Classification Search
USPC ........................................ 429/50
See application file for complete search history.

(56) References Cited

U.S. PATENT DOCUMENTS

| | | | |
|---|---|---|---|
| 1,501,756 | A | 7/1924 | Downs |
| 3,660,170 | A | 5/1972 | Rampel |

(Continued)

FOREIGN PATENT DOCUMENTS

| | | |
|---|---|---|
| JP | 59-75985 | 4/1984 |
| JP | 5975985 | 4/1984 |

(Continued)

OTHER PUBLICATIONS

Peramunage et al. ("Solid Sulfur Cathode for Aqueous Batteries" Science, 261: 1029 (Aug. 20, 1993)).*

(Continued)

*Primary Examiner* — Ula C Ruddock
*Assistant Examiner* — Jacob Marks
(74) *Attorney, Agent, or Firm* — David Fonda (57) ABSTRACT

The present invention provides a solid-state sodium-based secondary cell (or rechargeable battery). While the secondary cell can include any suitable component, in some cases, the secondary cell comprises a solid sodium metal negative electrode that is disposed in a non-aqueous negative electrolyte solution that includes an ionic liquid. Additionally, the cell comprises a positive electrode that is disposed in a positive electrolyte solution. In order to separate the negative electrode and the negative electrolyte solution from the positive electrolyte solution, the cell includes a sodium ion conductive electrolyte membrane. Because the cell's negative electrode is in a solid state as the cell functions, the cell may operate at room temperature. Additionally, where the negative electrolyte solution contains the ionic liquid, the ionic liquid may impede dendrite formation on the surface of the negative electrode as the cell is recharged and sodium ions are reduced onto the negative electrode.

20 Claims, 6 Drawing Sheets

(56) References Cited

U.S. PATENT DOCUMENTS

| | | | |
|---|---|---|---|
| 3,785,965 A | 1/1974 | Welty | |
| 3,787,315 A | 1/1974 | Bearden, Jr. et al. | |
| 3,788,978 A | 1/1974 | Bearden, Jr. et al. | |
| 3,791,966 A | 2/1974 | Bearden | |
| 3,970,472 A | 7/1976 | Steffensen | |
| 4,041,215 A | 8/1977 | Kormanyos et al. | |
| 4,053,371 A | 10/1977 | Towsley et al. | |
| 4,076,613 A | 2/1978 | Bearden, Jr. | |
| 4,182,797 A | 1/1980 | Kondo et al. | |
| 4,207,391 A | 6/1980 | Church et al. | |
| 4,244,986 A | 1/1981 | Paruso et al. | |
| 4,298,666 A | 11/1981 | Taskier | |
| 4,307,164 A | 12/1981 | Church et al. | |
| 4,372,823 A | 2/1983 | Church et al. | |
| 4,465,744 A | 8/1984 | Susman et al. | |
| 4,479,856 A | 10/1984 | Ando | |
| 4,542,444 A | 9/1985 | Boland | |
| 4,546,055 A | 10/1985 | Coetzer et al. | |
| 4,623,597 A | 11/1986 | Sapru et al. | |
| 4,753,858 A * | 6/1988 | Jow | 429/217 |
| 4,828,939 A | 5/1989 | Turley et al. | |
| 4,842,963 A | 6/1989 | Ross, Jr. et al. | |
| 4,937,155 A | 6/1990 | Tokoi et al. | |
| 5,057,206 A | 10/1991 | Engel et al. | |
| 5,213,908 A | 5/1993 | Hagedorn | |
| 5,290,405 A | 3/1994 | Joshi et al. | |
| 5,342,709 A | 8/1994 | Yahnke et al. | |
| 5,422,197 A * | 6/1995 | Zito | 429/51 |
| 5,427,873 A | 6/1995 | Shuster | |
| 5,516,598 A | 5/1996 | Visco et al. | |
| 5,525,442 A | 6/1996 | Shuster | |
| 5,541,019 A | 7/1996 | Anani et al. | |
| 5,552,244 A * | 9/1996 | Griffin et al. | 429/188 |
| 5,563,006 A * | 10/1996 | Von Benda et al. | 429/104 |
| 5,580,430 A | 12/1996 | Balagopal et al. | |
| 5,686,201 A | 11/1997 | Chu | |
| 5,695,632 A | 12/1997 | Brons et al. | |
| 5,780,186 A | 7/1998 | Casey, Jr. | |
| 5,856,047 A | 1/1999 | Venkatesan et al. | |
| 5,882,812 A | 3/1999 | Visco et al. | |
| 5,935,421 A | 8/1999 | Brons et al. | |
| 6,017,651 A | 1/2000 | Nimon et al. | |
| 6,025,094 A | 2/2000 | Visco et al. | |
| 6,030,720 A | 2/2000 | Chu et al. | |
| 6,033,343 A | 3/2000 | Licht | |
| 6,110,236 A | 8/2000 | Tsang et al. | |
| 6,153,328 A | 11/2000 | Colborn | |
| 6,159,634 A | 12/2000 | Yen et al. | |
| 6,165,644 A | 12/2000 | Nimon et al. | |
| 6,200,704 B1 | 3/2001 | Katz et al. | |
| 6,210,564 B1 | 4/2001 | Brons et al. | |
| 6,210,832 B1 | 4/2001 | Visco et al. | |
| 6,214,061 B1 | 4/2001 | Visco et al. | |
| 6,225,002 B1 | 5/2001 | Nimon et al. | |
| 6,248,476 B1 | 6/2001 | Sun et al. | |
| 6,248,481 B1 | 6/2001 | Visco et al. | |
| 6,265,100 B1 | 7/2001 | Saaski et al. | |
| 6,291,090 B1 | 9/2001 | Kuznetsov et al. | |
| 6,310,960 B1 | 10/2001 | Saaski et al. | |
| 6,355,379 B1 | 3/2002 | Ohshita et al. | |
| 6,358,643 B1 | 3/2002 | Katz et al. | |
| 6,368,486 B1 | 4/2002 | Thompson et al. | |
| 6,376,123 B1 | 4/2002 | Chu | |
| 6,402,795 B1 | 6/2002 | Chu et al. | |
| 6,413,284 B1 | 7/2002 | Chu et al. | |
| 6,413,285 B1 | 7/2002 | Chu et al. | |
| 6,416,903 B1 | 7/2002 | Fierro et al. | |
| 6,432,584 B1 | 8/2002 | Visco et al. | |
| 6,537,701 B1 | 3/2003 | Nimon et al. | |
| 6,610,440 B1 | 8/2003 | LaFollette et al. | |
| 6,632,573 B1 | 10/2003 | Nimon et al. | |
| 6,737,197 B2 | 5/2004 | Chu et al. | |
| 6,787,019 B2 | 9/2004 | Jacobson et al. | |
| 6,852,450 B2 | 2/2005 | Hwang et al. | |
| 6,881,234 B2 | 4/2005 | Towsley | |
| 6,911,280 B1 | 6/2005 | De Jonghe et al. | |
| 6,955,753 B1 | 10/2005 | Gomez | |
| 6,955,866 B2 | 10/2005 | Nimon et al. | |
| 6,991,662 B2 | 1/2006 | Visco et al. | |
| 7,070,632 B1 | 7/2006 | Visco et al. | |
| 7,144,654 B2 | 12/2006 | LaFollette et al. | |
| 7,166,384 B2 | 1/2007 | LaFollette et al. | |
| 7,214,443 B2 | 5/2007 | Clarke et al. | |
| 7,259,126 B2 | 8/2007 | Gordon et al. | |
| 7,282,295 B2 | 10/2007 | Visco et al. | |
| 7,282,296 B2 | 10/2007 | Visco et al. | |
| 7,282,302 B2 | 10/2007 | Visco et al. | |
| 7,390,591 B2 | 6/2008 | Visco et al. | |
| 7,432,017 B2 | 10/2008 | Visco et al. | |
| 7,482,096 B2 | 1/2009 | De Jonghe et al. | |
| 7,491,458 B2 | 2/2009 | Visco et al. | |
| 8,012,621 B2 | 9/2011 | Joshi et al. | |
| 8,088,270 B2 | 1/2012 | Gordon et al. | |
| 2002/0150818 A1 | 10/2002 | Amatucci et al. | |
| 2002/0172871 A1 * | 11/2002 | Schucker | 429/304 |
| 2003/0108788 A1 | 6/2003 | Miyoshi et al. | |
| 2004/0197641 A1 | 10/2004 | Visco et al. | |
| 2004/0229107 A1 | 11/2004 | Smedley | |
| 2005/0109617 A1 | 5/2005 | Ono et al. | |
| 2005/0175894 A1 | 8/2005 | Visco et al. | |
| 2006/0096893 A1 | 5/2006 | De Almeida et al. | |
| 2006/0141346 A1 | 6/2006 | Gordon et al. | |
| 2006/0177732 A1 | 8/2006 | Visco et al. | |
| 2006/0226022 A1 | 10/2006 | Balagopal et al. | |
| 2006/0257734 A1 | 11/2006 | Obata et al. | |
| 2007/0048610 A1 | 3/2007 | Tsang et al. | |
| 2007/0048617 A1 | 3/2007 | Inda | |
| 2007/0154762 A1 | 7/2007 | Schucker | |
| 2007/0172739 A1 | 7/2007 | Visco et al. | |
| 2007/0221265 A1 | 9/2007 | Affinito et al. | |
| 2007/0259235 A1 | 11/2007 | Jacobson et al. | |
| 2008/0268327 A1 | 10/2008 | Gordon et al. | |
| 2009/0061288 A1 | 3/2009 | Gordon et al. | |
| 2009/0134842 A1 | 5/2009 | Joshi et al. | |
| 2009/0136830 A1 | 5/2009 | Gordon | |
| 2009/0189567 A1 | 7/2009 | Joshi et al. | |
| 2009/0212743 A1 * | 8/2009 | Hagiwara et al. | 320/137 |
| 2010/0068629 A1 | 3/2010 | Gordon | |
| 2010/0239893 A1 | 9/2010 | Gordon et al. | |
| 2010/0285372 A1 | 11/2010 | Lee et al. | |
| 2012/0040274 A1 | 2/2012 | Gordon | |
| 2012/0126752 A1 | 5/2012 | Joshi et al. | |
| 2012/0141856 A1 | 6/2012 | Gordon et al. | |

FOREIGN PATENT DOCUMENTS

| | | |
|---|---|---|
| JP | 62186470 | 8/1987 |
| JP | 08321322 A | 12/1996 |
| JP | 2001-307709 | 11/2001 |
| JP | 2001307709 | 11/2001 |
| JP | 2002-245847 A | 8/2002 |
| KR | 2004047664 | 6/2004 |
| KR | 100651246 | 8/2005 |
| KR | 20070021110 | 2/2007 |
| KR | 20070021110 A | 2/2007 |
| KR | 2007028588 | 3/2007 |
| WO | WO-2005/038953 | 4/2005 |
| WO | WO2005038953 | 4/2005 |
| WO | WO-2005/091946 | 10/2005 |

OTHER PUBLICATIONS

Yun, Cho K., "International Search Report", PCT App. No. PCT/US2012/036959 (corresponding to U.S. Appl. No. 13/466,844), (Nov. 23, 2012),1-3.

Yun, Cho K., "Written Opinion of the International Searching Authority", PCT App. No. PCT/US2012/036959 (corresponding to U.S. Appl. No. 13/466,844), (Nov. 23, 2012),1-5.

Goodenough, J.B. et al., "Fast Na+-Ion Transport in Skeleton Structures", *Mat. Res. Bull.*, vol. 11, Pergamon Press, Inc. Printed in the United States,(1976),203-220.

(56) References Cited

OTHER PUBLICATIONS

Hong, H.Y-P. et al., "Crystal Structures and Crystal Chemistry in the System Na1+xZr2SixP3-xO12", *Mat. Res. Bull.*, vol. 11, 1976. Pergamon Press, Inc. Printed in the United States.,(1976),173-186.

Bentzen, J. J., et al., "The preparation and characterization of dense, highly conductive Na5GdSi4O12 nasicon (NGS)", *Materials Research Bulletin*, vol. 15,(1980),1737-1745.

Delmas, C. et al., "Crystal chemistry of the Na1+xZr2-xLx(PO4)3 (L=Cr, In, Yb) solid solutions", *Materials Research Bulletin*, vol. 16,(1981),285-290.

Von Alpen, V. et al., "Compositional dependence of the electrochemical and structural parameters in the NASICON system (Na1+xSixZr2P3-xO12)", *Solid State Ionics*, vol. 3/4,(1981),215-218.

Fujitsu, S. et al., "Conduction paths in sintered ionic conductive material Na1+xYxZr2-x(PO4)3", *Materials Research Bulletin*, vol. 16,(1981),1299-1309.

Saito, Y. et al., "Ionic Conductivity of NASICON-type conductors Na1.5M0.5Zr1.5(PO4)3 (M: Al3+, Ga3+, Cr3+, Sc3+, Fe3+, In3+, Yb3+, Y3+)", *Solid State Ionics*, vol. 58,(1992),327-331.

Alamo, J. "Chemistry and properties of solids with the [NZP] skeleton", *Solid State Ionics*, vol. 63-65,(1993),547-561.

Shimazu, K. et al., "Electrical conductivity and Ti4+ ion substitution range in NASICON system", *Solid State Ionics*, vol. 79, (1995),106-110.

Miyajima, Y. et al., "Ionic conductivity of NASICON-type Na1+xMxZr2-xP3O12(M: Yb, Er, Dy)", *Solid State Ionics*, vol. 84,(1996),61-64.

Manickam, Minakshi et al., "Lithium insertion into manganese dioxide electrode in MnO2/Zn aqueous battery Part I. A preliminary study", *Journal of Power Sources*, vol. 130, Issues 1-2 (Obtained through ScienceDirect),(May 2004),254-259.

Sumathipala, et al., "Novel Li+ Ion Conductors and Mixed Conductors, Li3+xSixCr1-xO4 and a Simple Method for Estimating Li+/e-Transport Numbers", *J. Electrochem. Soc.*, vol. 142, No. 7,(Jul. 1995),2138-2143.

Kowalczk, et al., "Li-air batteries: A classic example of limitations owing to solubilities", *Pure Appl. Chem.*, vol. 79, No. 5,(2007),851-860.

Read, "Characterization of the Lithium/Oxygen Organic Electrolyte Battery", *J. Electrochem. Soc.*, vol. 149, No. 9,(2002),A1190-A1195.

Panero, et al., "High Voltage Lithium Polymer Cells Using a PAN-Based Composite Electrolyte", *J. Electrochem. Soc.*, vol. 149, No. 4,(2002),A414-A417.

Dissanayake, et al., "Lithium ion conducting Li4-2xGe1-xSxO4 solid electrolytes", *Solid State Ionics*, 62,(1993),217-223.

Balagopal, et al., "Selective sodium removal from aqueous waste streams with NaSICON ceramics", *Separation and Purification Technology*,15,(1999),231-237.

Sagane, et al., "Li+ and Na+ transfer through interfaces between inorganic solid electrolytes and polymer or liquid electrolytes", *Journal of Power Sources*, 146,(2005),749-752.

Wang, et al., "LiTi2(PO4)3 with NASICON-type structure as lithium-storage materials", *Journal of Power Sources*, 124,(2003),231-236.

Dissanayake, et al., "New solid electrolytes and mixed conductors: Li3+xCr1-xMxO4: M=Ge, Ti", *Solid State Ionics*, 76,(1995),215-220.

Kerr, "Polymeric Electrolytes: An Overview", *Lithium Batteries: Science and Technology*, Chapter 19, edited by Nazri and Pistoia, Kluwer Academic Publishers,(2004),574-622.

Young, Lee W., "International Search Report", PCT Search Report for App. No. PCT/US 07/21978, (Oct. 10, 2008),1-2.

Young, Lee W., "Written Opinion of the International Searching Authority", PCT Written Opinion for App. No. PCT/US 07/21978, (Oct. 10, 2008),1-5.

Young, Lee W., "International Search Report", PCT Search Report for App. No. PCT/US 08/10435, (Nov. 25, 2008),1-2.

Young, Lee W., "Written Opinion of the International Searching Authority", PCT Written Opinion for App. No. PCT/US 08/10435, (Nov. 25, 2008),1-4.

Fu, "Effects of M3+ Ions on the Conductivity of Glasses and Glass-ceramics in the system Li2O—M2O3—GeO2—P2O5 (M=Al, Ga,Y, Dt, Gd, and La)", *Communications of the American Ceramic Society*, vol. 83, No. 4, (Apr. 2000),104-106.

Thokchom, et al., "Superionic Conductivity in a Lithium Aluminum Germanium Phosphate Glass-Ceramic", *Journal of the Electrochemical Society*, 155 (12), (Oct. 8, 2008),A915-A920.

Fu, "Fast Li+ Ion Conducting Glass Ceramics in the System Li2O—Al2O3—TiO2—P2O5", *Science Direct, Solid State Ionics*, vol. 104, Issues 3-4, (Dec. 11, 1997),191-194.

Saienga, et al., "The Comparative Structure, Property, and Ionic Conductivity of Li1+Li2S+GeS2 Glasses Doped with Ga2S3 and La2S3", *Journal of Non-Crystalline Solids*, vol. 354, 14, (Mar. 1, 2008),Abstract.

Wang, et al., "Polymer Composite Electrolytes Containing Active Mesoporous SiO2 Particles", *Journal of Applied Physics*, 102, (2007),1-6.

Wang, et al., "Li1.3Al0.3Ti1.7(PO4)3 Filler Effect on (PEO)LiClO4 Solid Polymer Electrode", *Department of Materials Science and Engineering*, Zhejiang University (2004),Abstract.

Kim, "International Search Report", International App. No. PCT/US2008/084707, (Apr. 29, 2009),1-3.

Kim, "Written Opinion of the International Searching Authority", International App. No. PCT/US2008/084707, (Apr. 29, 2009),1-4.

Park, Jin "Written Opinion of the International Searching Authority Mailed on Jun. 30, 2009", Int. App. No. PCT/US2008/084572, 1-3.

Park, Jin "International Search Report Mailed on Jun. 30, 2009", Int. App. No. PCT/US2008/084572, 1-3.

Kim, Jun Hak "Written Opinion of the International Searching Authority Mailed on Aug. 24, 2009", Int. App. No. PCT/US2009/032458, 1-4.

Kim, Jun Hak "International Search Report Mailed on Aug. 24, 2009", Int. App. No. PCT/US2009/032458, 1-3.

Kim, Yeon-Gyeong "PCT International Search Report", Int. App. No. PCT/US2009/056781, (Mar. 2, 2010),1-4.

Kim, Yeon-Gyeong "PCT Written Opinion", Int. App. No. PCT/US2009/056781, (Mar. 2, 2010),1-3.

Armand, Michel et al., "Ionic-liquid materials for the electrochemical challenges of the future", *Nature Materials*, (Jul. 24, 2009),621-629.

Doyle, Kevin P., et al., "Dentrite-Free Electrochemical Deposition of Li—Na Alloys from an Ionic Liquid Electrolyte", *Journal of the Electrochemical Society*, (May 2006),A1353-A1357.

Kim, K et al., "Electrochemical Investigation of Quaternary Ammonium/Aluminum Chloride Ionic Liquids", *Journal of the Electrochemical Society*, (Jun. 2004),A1168-A1172.

Kim, Ketack et al., "The Role of Additives in the Electroreduction of Sodium Ions in Chloroaluminate-Based Ionic Liquids", *Journal of The Electrochemical Society*, (Dec. 2004),E9-E13.

Lang, Christopher M., et al., "Cation Electrochemical Stability in Chloroaluminate Ionic Liquids", *J. Phys. Chem.*, (2005),19454-19462.

Salminen, Justin et al., "Ionic liquids for rechargeable lithium batteries", *Lawrence Berkeley National Laboratory*, (Sep. 21),1-19.

Apicella, Karie O., "Office Action for U.S. Appl. No. 12/323,165", (Jun. 1, 2011),1-10.

Cantelmo, Gregg "Office Action for U.S. Appl. No. 11/944,719", (Dec. 27, 2010),1-8.

Cullen, Sean P., "Office Action for U.S. Appl. No. 12/205,759", (Apr. 13, 2011),1-15.

Cullen, Sean P., "Office Action for U.S. Appl. No. 12/205,759", (Sep. 16, 2010),1-22.

IPDL Machine Translation of JP08-321322A, 1-10.

Kalafut, Stephen J., "Office Action for U.S. Appl. No. 11/871,824", (Dec. 10, 2010),1-7.

Kalafut, Stephen J., "Office Action for U.S. Appl. No. 11/871,824", (May 25, 2010),1-8.

Parsons, Thomas H., "Office Action for U.S. Appl. No. 12/022,381", (May 24, 2011),1-11.

(56) References Cited

OTHER PUBLICATIONS

Wu, Xian Ming et al., "Preparation and characterization of lithium-ion-conductive Li(1.3)Al(0.3)Tl(1.7)(PO4)3 thin films by the solution deposition", *Thin Solid Films 425*, (2003), 103-107.

Lee, Kang Young "International Search Report", International App. No. PCT/US2010/055718, (Jun. 21, 2011), 1-3.

Lee, Kang Young "Written Opinion", International App. No. PCT/US2010/055718, (Jun. 21, 2011), 1-3.

Imanaka, Nobuhito "IPDL Machine Translation of JP 2002-245847 A", IPDL Machine Translation of JP 2002-245847 A, (Aug. 30, 2002), 1-6.

Park, Jin "International Search Report", PCT App. No. US2008/084728 (Corresponding to U.S. Appl. No. 12/323,165), (Jun. 30, 2009), 1-3.

Park, Jin "Written Opinion of the International Searching Authority", PCT App. No. US2008/084728 (Corresponding to U.S. Appl. No. 12/323,165), (Jun. 30, 2009), 1-3.

Inda, Yasushi "Bibliography and Abstract (English Language)", Korean patent application publication KR20040047664, (Jun. 5, 2004), 1.

Inda, Yasushi "Bibliography and Abstract (English Language)", Korean Patent Application Publication KR20070028588, (Mar. 12, 2007), 1.

Apicella, Karie O., "Final Office Action", U.S. Appl. No. 12/323,165, (Sep. 8, 2011), 1-11.

Anthony, Julian "Non-Final Office Action", U.S. Appl. No. 12/558,363, (Jan. 5, 2012), 1-8.

Cullen, Sean P., "Non-Final Office Action", U.S. Appl. No. 12/725,319, (Jan. 6, 2012), 1-10.

Cullen, Sean P., "Final Office Action", U.S. Appl. No. 12/725,319, (Apr. 27, 2012), 1-12.

Cho, Jun B., "International Search Report", PCT App. No. US2010/027535 (Corresponding to U.S. Appl. No. 12/725,319), (Oct. 20, 2010), 1-4.

Cho, Jun B., "Written Opinion of the International Searching Authority", PCT App. No. US2010/027535 (Corresponding to U.S. Appl. No. 12/725,319), (Oct. 20, 2010), 1-5.

Ryu, et al., "Bibliographical Data and Abstract (English Language)", Application Publication for US2007154814, Corresponding to KR10-0651246, (Aug. 22, 2005), 1.

Wiedemann, Eric "Supplementary European Search Report", European Patent Application No. 10754004.9 (Corresponding to U.S. Appl. No. 12/725,319, (May 16, 2012), 1-6.

Suzuki, et al., "Bibliographical Data and Abstract (English Language)", Japanese Patent application JP62-186470, (Aug. 14, 1987), 1-2.

Jang, Sung W., "International Search Report", PCT/US2011/046143 (Corresponding to U.S. Appl. No. 13/195,431), (Feb. 27, 2012), 1-3.

Jang, Sung W., "Written Opinion of the International Searching Authority", PCT/US2011/046143 (Corresponding to U.S. Appl. No. 13/195,431, (Feb. 27, 2012), 1-3.

Kabe, T. et al., "Hydrodesulfurization and Hydrodenitrogenation", *Wiley-VCH* (1999), 37, 110-112.

Task Force on Strat. Uncnv. Fuel, "America's Strategic Unconventional Fuels, vol. III Resource and Technology Profiles", *America's Strategic Unconventional Fuels, vol. III Resource and Technology Profiles* (completed Feb. 2007, Published Sep. 2007)., Full text available at http://www.unconventionalfuels.org/publications/reports/Volume_III_ResourceTechProfiles(Final).pdf,(Sep. 2007),III-25.

Yang, Kyung S., "International Search Report", PCT App. No. PCT/US2011/062534 (Corresponding to U.S. Appl. No. 13/307,123), (Jul. 24, 2012), 1-3.

Yang, Kyung S., "Written Opinion of the International Searching Authority", PCT App. No. PCT/US2011/062534 (Corresponding to U.S. Appl. No. 13/307,123), (Jul. 24, 2012), 1-3.

Abraham, et al., "A Low Temperature Na-S Battery Incorporating a Soluble S Cathode", *ElectroChimica Acta*, 1978, vol. 23, Pergamon Press Ltd., (Jun. 1, 1978), 501-507.

Yoshimura, et al., "IPDL Machine Translation of JP-2001-307709", IPDL Machine Translation of JP-2001-307709, (Nov. 2, 2001), 1-12.

Sonoda, et al., "Bibliographical Data and Abstract (English Translation)", Japanese Patent Application JP-59-75985, (Apr. 28, 1984), 1-2.

Cullen, Sean P., "Non Final Office Action", U.S. Appl. No. 12/205,759, (Apr. 5, 2013), 1-17.

* cited by examiner

SOLID-STATE SODIUM-BASED SECONDARY CELL HAVING A SODIUM ION CONDUCTIVE CERAMIC SEPARATOR

CROSS-REFERENCE TO RELATED APPLICATION

This application claims priority to U.S. Provisional Patent Application Ser. No. 61/258,563, filed Nov. 5, 2009, and entitled "LOW TEMPERATURE RECHARGEABLE BATTERY WITH SODIUM ION CONDUCTIVE CERAMIC SEPARATOR;" the entire disclosure of which is hereby incorporated by reference.

FIELD OF THE INVENTION

The present invention relates in general to batteries. More particularly, the present invention provides a sodium-based secondary cell (or rechargeable battery) with a sodium ion conductive electrolyte membrane and a negative electrode comprises sodium metal, wherein the cell operates below the melting point of the sodium metal negative electrode.

BACKGROUND OF THE INVENTION

Batteries are known devices that are used to store and release electrical energy for a variety of uses. In order to produce electrical energy, batteries typically convert chemical energy directly into electrical energy. Generally, a single battery includes one or more galvanic cells, wherein each of the cells is made of two half-cells that are electrically isolated except through an external circuit. During discharge, electrochemical reduction occurs at the cell's positive electrode, while electrochemical oxidation occurs at the cell's negative electrode. While the positive electrode and the negative electrode in the cell do not physically touch each other, they are generally chemically connected by one or more ionically conductive and electrically insulative electrolytes, which can be in either a solid state, a liquid state, or in a combination thereof. When an external circuit, or a load, is connected to a terminal that is connected to the negative electrode and to a terminal that is connected to the positive electrode, the battery drives electrons through the external circuit, while ions migrate through the electrolyte.

Batteries can be classified in a variety of manners. For example, batteries that are completely discharged only once are often referred to as primary batteries or primary cells. In contrast, batteries that can be discharged and recharged more than once are often referred to as secondary batteries or secondary cells. The ability of a cell or battery to be charged and discharged multiple times depends on the Faradaic efficiency of each charge and discharge cycle.

While rechargeable batteries based on sodium can comprise a variety of materials and designs, many sodium batteries requiring a high Faradaic efficiency employ a solid primary electrolyte separator . . . . The principal advantage of using a solid ceramic primary electrolyte membrane is that the Faradaic efficiency of the resulting cell can approach 100%. Indeed, in almost all other cell designs, negative electrolyte and positive electrolyte solutions in the cell are able to intermix over time and, thereby, cause a drop in Faradaic efficiency and loss of battery capacity.

The primary electrolyte separators used in sodium batteries that require a high Faradaic efficiency often consist of ion conductive polymers, porous materials infiltrated with ion conductive liquids or gels, or dense ceramics. In this regard, most, if not all, rechargeable sodium batteries that are presently available for commercial applications comprise a molten sodium metal negative electrode, a sodium β"-alumina ceramic electrolyte separator, and a molten positive electrode, which may include a composite of molten sulfur and carbon (called a sodium/sulfur cell), or molten $NiCl_2$, NaCl, $FeCl_2$, and/or $NaAlCl_4$ (called a ZEBRA cell). Because these conventional high temperature sodium-based rechargeable batteries have relatively high specific energy densities and only modest power densities, such rechargeable batteries are typically used in certain specialized applications that require high specific energy densities where high power densities are typically not encountered, such as in stationary storage and uninterruptable power supplies.

Despite the beneficial characteristics associated with some conventional sodium-based rechargeable batteries, such batteries may have significant shortcomings. In one example, because the sodium β"-alumina ceramic electrolyte separator is typically more conductive and is better wetted by molten sodium at a temperature in excess of about 270° C. and/or because the molten positive electrode typically requires relatively high temperatures (e.g., temperatures above about 170° or 180° C.) to remain molten, many conventional sodium-based rechargeable batteries operate at temperatures higher than about 270° C. (e.g., above 300° C.) and are subject to significant thermal management problems and thermal sealing issues. For example, some sodium-based rechargeable batteries may have difficulty dissipating heat from the batteries or maintaining the negative electrode and the positive electrode at the relatively high operating temperatures. In another example, the relatively high operating temperatures of some sodium-based batteries can create significant safety issues. In still another example, the relatively high operating temperatures of some sodium-based batteries require battery components to be resistant to, and operable at, such high temperatures. Accordingly, such components can be relatively expensive. In yet another example, because it may require a relatively large amount of energy to heat some conventional sodium-based batteries to the relatively high operating temperatures, such batteries can be expensive to operate and energy inefficient.

The benefits of a sodium-based battery that can operate below the melting point of sodium, are clear, however, new technical challenges are encountered. For instance, batteries that use molten sodium often have the liquid metal negative electrode in direct contact with the ceramic electrolyte separator, thereby obviating the need for a secondary electrolyte. In contrast, where the negative electrode comprises solid sodium metal, a secondary liquid electrolyte disposed between the solid negative electrode and solid primary electrolyte is required. When such sodium-based secondary batteries are recharged and sodium ions are reduced at and plated on the negative electrode, sodium dendrites typically form between the negative electrode and the ceramic electrolyte separator. In some cases, such dendrites can penetrate the separator and cause the separator to fail. Thus, while sodium-based secondary batteries operating at low temperatures have been proposed, challenges with such batteries also exist, including those previously mentioned. Accordingly, it would be an improvement in the art to augment or even replace certain conventional sodium-based secondary batteries with other sodium-based secondary batteries.

BRIEF SUMMARY OF THE INVENTION

The present invention provides a sodium-based secondary cell that is operable at relatively low temperatures. More specifically, the present invention provides a secondary cell that is operable below the melting point of sodium metal. While the described solid-state sodium-based secondary cell may comprise any suitable component, in some non-limiting implementations, the cell includes a negative electrode compartment comprising a negative electrode, which is disposed in a non-aqueous negative electrolyte solution (or negative electrolyte); a positive electrode compartment that includes a positive electrode, which is disposed in a positive electrolyte solution (or positive electrolyte); and a sodium ion conductive electrolyte membrane that physically separates the negative electrolyte solution from the positive electrolyte solution.

The negative electrode comprises sodium metal when the secondary cell is at least partially charged. For ease of reference, the negative electrode may be referred to throughout the specification as a sodium negative electrode or a sodium metal negative electrode. It will be understand by those of skill in the art, however, that in an uncharged or fully discharged state, the negative electrode may not contain any sodium metal. The teachings of this invention include a device and method where the secondary cell is assembled in a discharged state with a sodium ion source available to plate as sodium metal on the negative electrode during the initial charge.

Generally, the sodium negative electrode comprises an amount of sodium metal that remains in the solid state as the cell operates. In this regard, the sodium negative electrode may comprise any suitable type of sodium, including, without limitation, a pure sample of sodium, an impure sample of sodium, and/or a sodium alloy. Indeed, in some non-limiting implementations, the negative electrode comprises a sodium sample that is substantially pure.

The non-aqueous negative electrolyte solution (or secondary electrolyte) may comprise any suitable electrolyte that is capable of transporting sodium ions, that is chemically compatible with the materials of the negative electrode and the sodium conductive electrolyte membrane, and that otherwise allows the cell to function as intended. Some non-limiting examples of suitable negative electrolyte solutions comprise organic electrolytes and ionic liquids. However, it is theorized that because certain ionic liquids have a higher ionic conductivity than the sodium ion conductive membrane and/or because some ionic liquids can act as a surfactant, such ionic liquids may impede dendrite formation on the negative electrode better than some organic electrolytes. Accordingly, in some non-limiting implementations, the negative electrolyte solution comprises an ionic liquid.

While the ionic liquid may have any suitable characteristic, in one embodiment, the ionic liquid generally comprises one or more large asymmetric organic cations and one or more inorganic anions. Additionally, in some non-limiting implementations, the ionic liquid comprises cations and/or anions that can be aromatic, comprise one asymmetrical tail, and/or have a variety of other suitable chemical features. In other embodiments, the ionic liquid is not asymmetric when comparing the cation with the anion. The cation may be large and the anion small, or vice versa. For example, in one embodiment, the ionic liquid is tri ethyl sulfonium, in which all three ligands are the same. Furthermore, because long-chain hydrocarbon tails tend to increase the viscosity of the ionic liquid, thus reducing the ionic conductivity of the ionic liquid, in some non-limiting implementations, the cations in the ionic liquid comprise short functional groups. Accordingly, in some non-limiting implementations, the ionic liquid has a relatively low-viscosity and a high ionic conductivity.

The positive electrode in the positive electrode compartment can comprise any suitable material that allows the cell to function as intended. Indeed, in some non-limiting implementations, the positive electrode comprises a wire, felt, mesh, plate, tube, or other suitable positive electrode configuration. Furthermore, some examples of suitable positive electrode materials include, but are not limited to, nickel, nickel oxyhydroxide (NiOOH) (e.g., when the cell is at least partially charged), nickel hydroxide ($Ni(OH)_2$) (e.g., when the cell is at least partially discharged), sulfur composites that are not molten at the cell's operating range, and/or any other suitable positive electrode material.

The positive electrolyte solution in the positive electrode compartment can comprise any suitable material that is capable of conducting sodium ions to and from the electrolyte membrane and that otherwise allows the cell to function as intended. Some examples of suitable positive electrolyte materials include, but are not limited to, sodium hydroxide, water, glycerol, borax, sodium tetraborate decahydrate, sodium metaborate tetrahydrate, boric acid, sodium borohydride, sodium borate, sodium phosphate, sodium hydrogen phosphate, sodium glycerol, sodium carbonate, ethylene, propylene, one or more ionic liquids, and any suitable combination thereof. Indeed, in some non-limiting instances, the positive electrolyte solution comprises an aqueous sodium hydroxide solution. In still other non-limiting instances, the positive electrolyte comprises sodium tetraborate decahydrate dissolved in excess water at a concentration of about 50%, by weight, ±10%.

The sodium ion conductive electrolyte membrane (or primary electrolyte) can comprise any membrane (which is used herein to refer to any suitable type of separator) that: selectively transports sodium ions, that is stable at the cell's operating temperature, that is stable when in contact with the non-aqueous negative electrolyte system and the positive electrolyte solution, that is sufficiently ionically conductive at the cell's operating temperature, and that otherwise allows the cell to function as intended. Indeed, in some non-limiting implementations, the electrolyte membrane comprises a NaSICON-type membrane that is substantially impermeable to water. Accordingly, in such implementations, the water impermeable electrolyte membrane can allow the positive electrolyte solution to comprise an aqueous solution, which would react violently if it were to contact the sodium negative electrode.

Where the electrolyte membrane comprises a NaSICON-type membrane, the membrane can comprise any suitable kind of NaSICON-type membrane, including, without limitation, a composite NaSICON membrane. In this regard, and by way of non-limiting illustration, the membrane can comprise any known or novel composite NaSICON membrane that includes a dense NaSICON layer and a porous NaSICON layer, or a dense NaSICON layer with a cermet layer, such as a NiO/NaSICON cermet layer.

The described cell may operate at any suitable operating temperature that allows the negative electrode to remain in a solid state. Indeed, in some instances, the cell functions (e.g., is discharged and/or recharged) while the cell's temperature is less than a temperature selected from about 100° C., about 98° C., about 80° C., about 60° C., about 40° C., about 30° C., about 20° C. and about 10° C. Indeed, in some non-limiting implementations, the cell functions at temperature that is about 25° C.±10° C.

These features and advantages of the present invention will become more fully apparent from the following description and appended claims, or may be learned by the practice of the invention as set forth hereinafter.

BRIEF DESCRIPTION OF THE SEVERAL DRAWINGS

In order that the manner in which the above-recited and other features and advantages of the invention are obtained and will be readily understood, a more particular description of the invention briefly described above will be rendered by reference to specific embodiments thereof that are illustrated in the appended drawings. Understanding that the drawings are not made to scale, depict only some representative embodiments of the invention, and are not therefore to be considered to be limiting of its scope, the invention will be described and explained with additional specificity and detail through the use of the accompanying drawings in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment. Additionally, while the following description refers to several embodiments and examples of the various components and aspects of the described invention, all of the described embodiments and examples are to be considered, in all respects, as illustrative only and not as being limiting in any manner.

Furthermore, the described features, structures, or characteristics of the invention may be combined in any suitable manner in one or more embodiments. In the following description, numerous specific details are provided, such as examples of suitable negative electrodes, positive electrodes, negative electrolyte solutions, positive electrolyte solutions, sodium ion conductive electrolyte membranes, etc., to provide a thorough understanding of embodiments of the invention. One having ordinary skill in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

As stated above, secondary cells can be discharged and recharged and this specification describes cell arrangements and methods for both states. Although the term "recharging" in its various forms implies a second charging, one of skill in the art will understand that discussions regarding recharging would be valid for, and applicable to, the first or initial charge, and vice versa. Thus, for the purposes of this specification, the terms "recharge," "recharged" and "rechargeable" shall be interchangeable with the terms "charge," "charged" and "chargeable" respectively.

Figure 1:
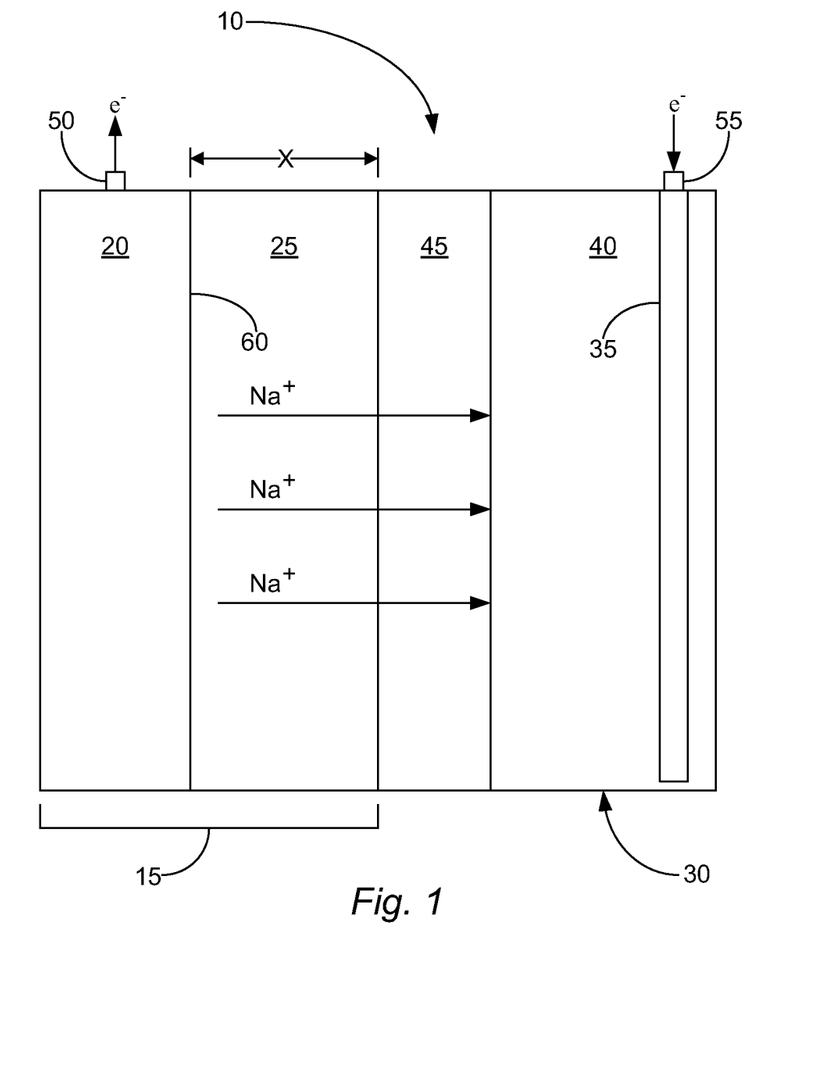
FIG. 1 depicts a schematic of a representative embodiment of a solid-state sodium-based secondary cell, wherein the cell is in the process of being discharged.

The present invention provides a solid-state sodium-based secondary cell that is operable at relatively low temperatures. More specifically, the present invention provides a secondary cell that is operable below the melting point of sodium metal. While the sodium-based secondary cell can comprise any suitable component, FIG. 1 shows a representative embodiment in which the solid-state sodium-based secondary cell 10 comprises a negative electrode compartment 15, which includes a sodium metal negative electrode 20 disposed in a non-aqueous negative electrolyte solution 25; a positive electrode compartment 30, which comprises a positive electrode 35 that is disposed in a positive electrolyte solution 40; a sodium ion conductive electrolyte membrane 45 that separates the negative electrolyte from the positive electrolyte; a first terminal 50; and a second terminal 55. To provide a better understanding of the described cell 10, a brief description of how the cell functions is provided below. Following this discussion, each of the cell's components shown in FIG. 1 is discussed in more detail.

Turning now to the manner in which the solid-state sodium secondary cell 10 functions, the cell can function in virtually any suitable manner. In one example, FIG. 1 illustrates that as the cell 10 is discharged and electrons ($e^-$) flow from the negative electrode 20 (e.g., via the first terminal 50), sodium is oxidized at the negative electrode 20 to form sodium ions ($Na^+$). FIG. 1 shows that these sodium ions are respectively transported from an interface surface 60 of the negative electrode 20, through the negative electrolyte 25, through the sodium ion conductive electrolyte membrane 45, and to the positive electrolyte 40.

Figure 2:
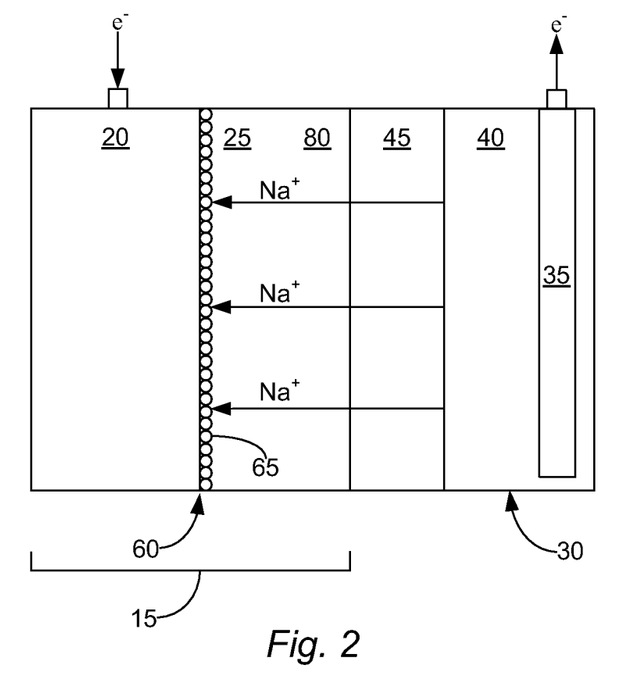
FIG. 2 depicts a schematic of a representative embodiment of the solid-state sodium-based secondary cell, wherein the cell comprises a non-aqueous ionic liquid secondary electrolyte, and wherein the cell is in the process of being recharged.

In a contrasting example, FIG. 2 shows that as the solid-state sodium-based secondary cell 10 is recharged and electrons ($e^-$) flow into the solid sodium negative electrode 20 (e.g., via the second terminal 55) from an external power source (not shown), such as a recharger, the chemical reactions that occurred when the cell was discharged (as shown in FIG. 1) are reversed. Specifically, FIG. 2 shows that as the cell 10 is recharged, sodium ions ($Na^+$) are respectively transported from the positive electrolyte 40, through the sodium ion conductive electrolyte membrane 45, through the non-aqueous negative electrolyte 25, and to the negative electrode 20, where the sodium ions are reduced and plated 65 as sodium metal on the negative electrode's interface surface 60.

Referring now to the various components of the cell 10, the cell (as mentioned above) can comprise a negative electrode compartment 15 and a positive electrode compartment 30. In this regard, the two compartments can be any suitable shape and have any other suitable characteristic that allows the cell 10 to function as intended. By way of example, the negative electrode compartment and the positive electrode compartment can each be tubular, rectangular, or be any other suitable shape. Furthermore, the two compartments can have any suitable spatial relationship with respect to each other. For instance, while FIG. 2 shows that the negative electrode compartment 15 and the positive electrode compartment 30 can be adjacent to each other, in other embodiments (not shown), one compartment (e.g., the negative electrode compartment) is disposed, at least partially, within the other compartment (e.g., the positive electrode compartment), while the contents of the two compartments remain separated by the sodium ion conductive electrolyte membrane 45 and any other compartmental walls.

With respect to the sodium metal negative electrode 20, the cell 10 can comprise any suitable sodium negative electrode 20 that allows the cell to function (e.g., be discharged and/or recharged) as intended. Some examples of suitable sodium negative electrode materials include, but are not limited to, a sodium sample that is substantially pure, an impure sodium sample, and a sodium alloy comprising any other suitable sodium-containing negative electrode material. That said, in certain embodiments in which the cell is assembled in a discharged state using sodium salts in the positive electrolyte 40 and the cell is then charged to move sodium ions through the electrolyte membrane 45 to the negative electrode, electrochemical reduction can occur at the negative electrode resulting in a negative electrode that comprises or consists of an amount of sodium that is substantially pure when the secondary cell is at least partially charged. In such embodiments, because the melting point of pure sodium is around 98° C., the sodium negative electrode may be kept below that temperature as the cell operates. Of course, where the sodium negative electrode comprises a sodium alloy or an impure sodium metal, the melting point of the negative electrode may be higher than 98° C. and the cell may be able to operate at a temperature above 98° C. without melting the negative electrode.

With regards to the non-aqueous negative electrolyte solution 25 (or secondary electrolyte), the negative electrolyte may comprise any suitable non-aqueous electrolyte that is chemically compatible (e.g., does not react chemically) with the materials of the sodium metal negative electrode 20 and the electrolyte membrane 45 and which is capable acting as an interphase to conduct sodium ions (Na$^+$) between the negative electrode and the electrolyte membrane. Some non-limiting examples of suitable non-aqueous negative electrolytes may include organic electrolytes and ionic liquids.

Where the negative electrolyte solution 25 comprises an organic electrolyte, the negative electrolyte may comprise any organic electrolyte that is suitable for use with the solid-state sodium-based secondary cell. Some non-limiting examples of suitable organic electrolytes may include propylene carbonate, dimethoxy ethane, a polyosiloxane-based compound, a sodium salt, and/or a polar aprotic organic solvent, such as acetonitrile, acetone, tetrahydrofuran, methyl ethyl ketone, dimethyl sulfoxide, and/or ethyl acetate.

Figure 3:
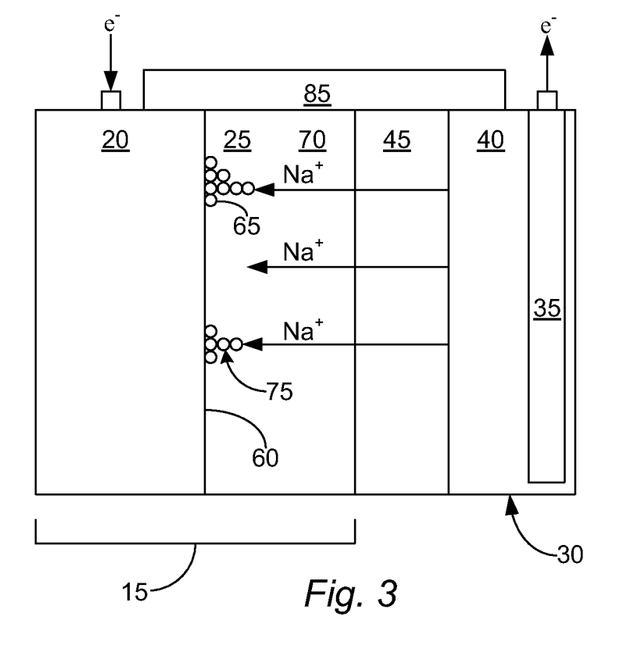
FIG. 3 depicts a schematic of a solid-state sodium-based secondary cell, wherein the cell is in the process of being recharged.

It should be noted that some organic electrolytes may have shortcomings. Indeed, as illustrated in FIG. 3, where the negative electrolyte 25 comprises an organic electrolyte 70, the organic electrolyte may allow sodium ions (Na$^+$) to be reduced (e.g., during recharge) unevenly on the interface surface 60 and to form dendrites 75 due to slight variations in the electric field through the organic electrolyte 70. Because such dendrites 75 may eventually contact and even penetrate the electrolyte membrane 45 to cause ceramic failure, in certain embodiments, certain ionic liquids, which may impede dendrite growth, are used in place of organic electrolytes.

Where the non-aqueous negative electrolyte 25 comprises an ionic liquid 80 (as shown in FIG. 2), the ionic liquid may comprise any suitable chemical that is chemically compatible with the materials of the negative electrode 20 and the electrolyte membrane 45 and that has a high ionic conductivity. In this regard, in some embodiments, the ionic liquid comprises or consists of an organic cation and an inorganic anion.

Where the ionic liquid comprises an organic cation, the organic cation can have any suitable characteristic, including, without limitation, being relatively large in size. Some examples of suitable organic cations include, but are not limited to, N-methoxyethyl-N-methyl-pyrrolidinium, butyl-methyl-pyrrolidinium, propylmethyl-pyrrolidinium, triethyl-sulfonium, diethylmethylsulfonium, ethyl-dimethyl-ammonio-(trimethylammonio)-dihydroborate, pyridinium, pyrrolidinium, quaternary ammonium, quaternary phosphonium, trisulfonium, and sulfonium compounds, as shown below.

Pyridinium   Pyrrolidinium

Ammonium   Phosphonium   Sulfonium

The substituent groups $R_1$, $R_2$, $R_3$, and/or $R_4$ on the cation in the ionic liquid can have any suitable characteristic. Indeed, in one non-limiting example, at least one of the substituents $R_1$, $R_2$, $R_3$, and/or $R_4$ is different from the other substituents so that the cation is asymmetric. Indeed, in some embodiments, three out of four quaternary substituents are the same. In other embodiments, however, two of the four quaternary substituents are the same. In still other embodiments, all four substituents are different from each other.

In another non-limiting example, the substituent groups on the ionic liquid can comprise any suitable chemical group. Indeed, in some embodiments, $R_1$, $R_2$, $R_3$, and/or $R_4$ comprise a C1 to C10 alkyl, alkenyl, alkynyl, ether, ketone, or similar group. In other embodiments, $R_1$, $R_2$, $R_3$, and/or $R_4$ comprise a C1 to C5 alkyl, alkenyl, alkynyl, ether, ketone, or similar group. More specifically, in some embodiments, the cation comprises a functional group that is aromatic, such as phenyl. In selecting the size of $R_1$, $R_2$, $R_3$, and $R_4$, it is notable that longer carbon chains tend to decrease ion mobility and conductivity and tend to increase viscosity. Thus, in some embodiments, three of $R_1$, $R_2$, $R_3$, and $R_4$ are short and one is long. Short chains may be defined as containing three or fewer carbons. Examples of a short $R_1$, $R_2$, $R_3$, or $R_4$, may include methyl, ethyl, or propyl chains. Long chains may be defined as containing more than three carbons.

In other embodiments, two substituents are short, one is medium, and one is long. In yet other embodiments, all of the substituents are different, but selected to provide acceptable ion mobility and conductivity.

Referring now to the inorganic anions that can be found in the ionic liquid, the ionic liquid can comprise any suitable inorganic anion. Indeed, some examples of suitable inorganic anions include, but are not limited to, aluminum trichloride ($AlCl_3^-$) hexafluorophosphate ($PF_6^-$), tetrafluoroborate ($BF_4^-$), trifluoromethylsulfonate ($CF_3SO_3^-$), bis(trifluoromethanesulfonyl)imide (($CF_3SO_2)_2N^-$), and/or any other suitable anion. In one embodiment, $Cl^-$ or other halide ions may work as the anion as well. Another suitable anion may include a perchlorate ion. Furthermore, while the anions can have any suitable characteristic, in some embodiments, anions in the ionic liquid are fluorinated.

Some examples of suitable ionic liquids 80 include, but are not limited to, methanesulfonyl chloride aluminum trichloride, ether-substituted quaternary ammonium chloride aluminum trichloride, n-butylmethylpyrrolidinium bis(trifluoromethanesulfonyl)imide, benzyldimethylpropylammonium chloride aluminum trichloride, octylmethylimidazolium bis (trifluoromethanesulfonyl)imide, butylmethylpyridinium bis(trifluoromethanesulfonyl)imide, butylmethylpyridinium tetrafluoroborate, tributylmethylammonium chloride aluminum trichloride, any other suitable ionic liquid, and/or any combination of such anions and cations.

The ionic liquid 80 may have any suitable characteristic that allows it to be chemically compatible with the negative electrode 20 and the electrolyte membrane 45 and to have a relatively high ionic conductivity, which, in some embodiments, is higher than the ionic conductivity of the electrolyte membrane 45. For example, in one embodiment where a NaSICON-type electrolyte membrane separates the negative electrolyte solution from the positive electrolyte solution, the electrolyte membrane has a lower ionic conductivity than the negative electrolyte solution. Indeed, in some embodiments, the ionic liquid is in the liquid state at STP, has little or no vapor pressure at STP, has a relatively low viscosity at STP, and/or decomposes rather than boils at high temperatures. Accordingly, in some instances, the ionic liquid may be referred to as a room temperature ionic liquid ("RTIL") or a room temperature melt. Additionally, in some embodiments, one or more cations and/or anions in the ionic liquid are asymmetrical.

In addition to the aforementioned components, in some embodiments, the ionic liquid 80 optionally includes an organic or inorganic additive that can aid in the electrochemical oxidation or reduction of the sodium ions. While the organic or inorganic additive may function in any suitable manner, in some instances, the presence of an additive increases the degree of dissociation of the sodium ion in the ionic liquid. In any case, the ionic liquid can comprise any suitable organic or inorganic additive. In this regard, some examples of suitable additives to the ionic liquid include, without limitation, an additive that: is acidic in nature, comprises one or more small halogenated compounds, comprises one or more chlorinated compounds, comprises a fluorinated compound, comprises a sodium-based salt, and/or comprises any other suitable additive or combinations thereof. Some examples of such additives include, without limitation, hydrochloric acid (HCl), sulfonyl chloride ($SOCl_2$), dichloromethane ($CH_2Cl_2$), carbon tetrachloride ($CCl_4$), and salts of the trifluoroacetate ion ($CF_3COO^-$). Additionally, some non-limiting examples of sodium-based salt additives that can be added to the ionic liquid to increase the free sodium ion in the ionic liquid, thereby increasing the sodium ion conductivity, include, but are not limited to, NaCl, NaI, NaBr, $NaClO_4$, or a similar sodium salt.

Where the cell 10 comprises the ionic liquid, the ionic liquid may provide the cell with a number of beneficial characteristics. In one non-limiting example of such a beneficial characteristic, FIG. 2 shows that the ionic liquid 80 may impede dendrite growth and encourage sodium ions ($Na^+$) to be reduced (e.g., as the cell 10 is recharged) to form a substantially smooth plating or layer 65 on the negative electrode 20. The ionic liquid may perform this function in any suitable manner. Indeed, under one non-binding theory it is believed that large cations in the ionic liquid may act as surfactants that lower surface energy at the negative electrode's interface surface 60 and, thereby, help sodium ions to be evenly plated on the negative electrode as the cell is recharged. Under another non-binding theory, it is believed that where the ionic liquid has a higher ion conductivity than the electrolyte membrane, the ionic liquid may lower the voltage gradient relative to the electrolyte membrane in a manner that causes sodium ions to be reduced and uniformly plated on the negative electrode's interface surface.

In another example of a beneficial characteristic that can be provided by the ionic liquid 80, where the ion conductivity of the ionic liquid is higher than the ion conductivity of the electrolyte membrane 45, the ionic liquid may readily transport sodium ions ($Na^+$) from the electrolyte membrane 45 to the negative electrode 20. In this manner, the ionic liquid may prevent the electrolyte membrane from becoming coated with sodium metal as the cell 10 functions.

In order to function as intended, the ionic liquid 80 may have any suitable level of sodium conductivity. In some embodiments, the ionic liquid has a sodium conductivity that is greater than about $2\times10^{-4}$ mS/cm. In other embodiments, the ionic liquid has a sodium conductivity that is greater than about $4\times10^{-4}$ mS/cm. In still other embodiments, the ionic liquid has a sodium conductivity that is greater than about $6\times10^{-4}$ mS/cm. In yet other embodiments, the ionic liquid has a conductivity that is greater than about $1\times10^{-3}$ mS/cm. In still other embodiments, the ionic liquid has a conductivity that is greater than about $1\times10^{-2}$ mS/cm. In some embodiments, the conductivity ranges between about 0.1 mS/cm to about 100 mS/cm at temperatures from 25° C. to 100° C. By way of non-limiting illustration, Table 1 shows table indicating some representative AC (alternating current) conductivities of some suitable ionic liquid systems at a variety of temperatures. In particular, Table 1 shows some non-limiting AC conductivities for N-methoxyethyl-N-methyl-pyrrolidinium and bis(trifluoromethane-sulfonyl)imide (collectively referred to as "NM-NM-P"), propylmethyl-pyrrolidinium and bis(trifluoromethane-sulfonyl)imide (collectively referred to as "PMP"), butylmethyl-pyrrolidinium and bis(trifluoromethane-sulfonyl)imide (collectively referred to as "BMP"), and ethyl-dimethyl-ammonio-(trimethylammonio)-dihydroborate and bis(trifluoromethane-sulfonyl)imide (collectively referred to as "Et3S").

TABLE 1

| AC Conductivities of Non-limiting Ionic Liquid Systems | | | | |
|---|---|---|---|---|
| IL Name | Temp., ° C. | ~1000/K | Resistivity, ohm-cm | Conductivity, mS/cm |
| NM-NM-P | 30 | 3.3 | 373.2 | 2.7 |
|  | 38 | 3.2 | 164.5 | 6.1 |
|  | 73 | 2.9 | 79.3 | 12.6 |
| PMP | 30 | 3.3 | 287.9 | 3.5 |
|  | 46 | 3.1 | 158.9 | 6.3 |
|  | 66 | 2.9 | 208.9 | 4.8 |
| BMP | 30 | 3.3 | 130.9 | 7.6 |
|  | 43 | 3.1 | 103.3 | 9.7 |
|  | 65 | 2.9 | 58.8 | 17.0 |
| Et3S | 30 | 3.3 | 77.5 | 12.9 |
|  | 48 | 3.1 | 39.9 | 25.0 |
|  | 70 | 2.9 | 26.4 | 37.8 |

With regards now to the positive electrode 35, the cell 10 can comprise any suitable positive electrode that allows the cell to be charged and discharged as intended. For instance, the positive electrode can comprise virtually any positive electrode material that has been successfully used in a solid-state sodium-based rechargeable battery system. In some embodiments, the positive electrode comprises a wire, felt, plate, tube, mesh, foam, and/or other suitable positive electrode configuration. Furthermore, in some non-limiting embodiments, the positive electrode comprises a material selected from a nickel foam, a sodium composite that is not molten at the cell's operating temperature (including, without limitation, a sodium/sulfur material), nickel hydroxide (Ni(OH)$_2$) (e.g., when the cell is at least partially discharged), nickel oxyhydroxide (NiOOH) (e.g., when the cell is at least partially charged), and/or another suitable material.

In some non-limiting embodiments where the positive electrode 35 comprises a nickel oxyhydroxide (NiOOH) electrode, the negative electrode 20 comprises sodium, and the positive electrolyte 40 (as discussed below) comprises an aqueous solution, the reactions that occur at the negative electrode and at the positive electrode and the overall reaction as the cell 10 is discharged may occur as illustrated below:

Accordingly, some embodiments of the describe cell 10, at least theoretically, are capable of producing up to about 3.23V.

Figure 4:
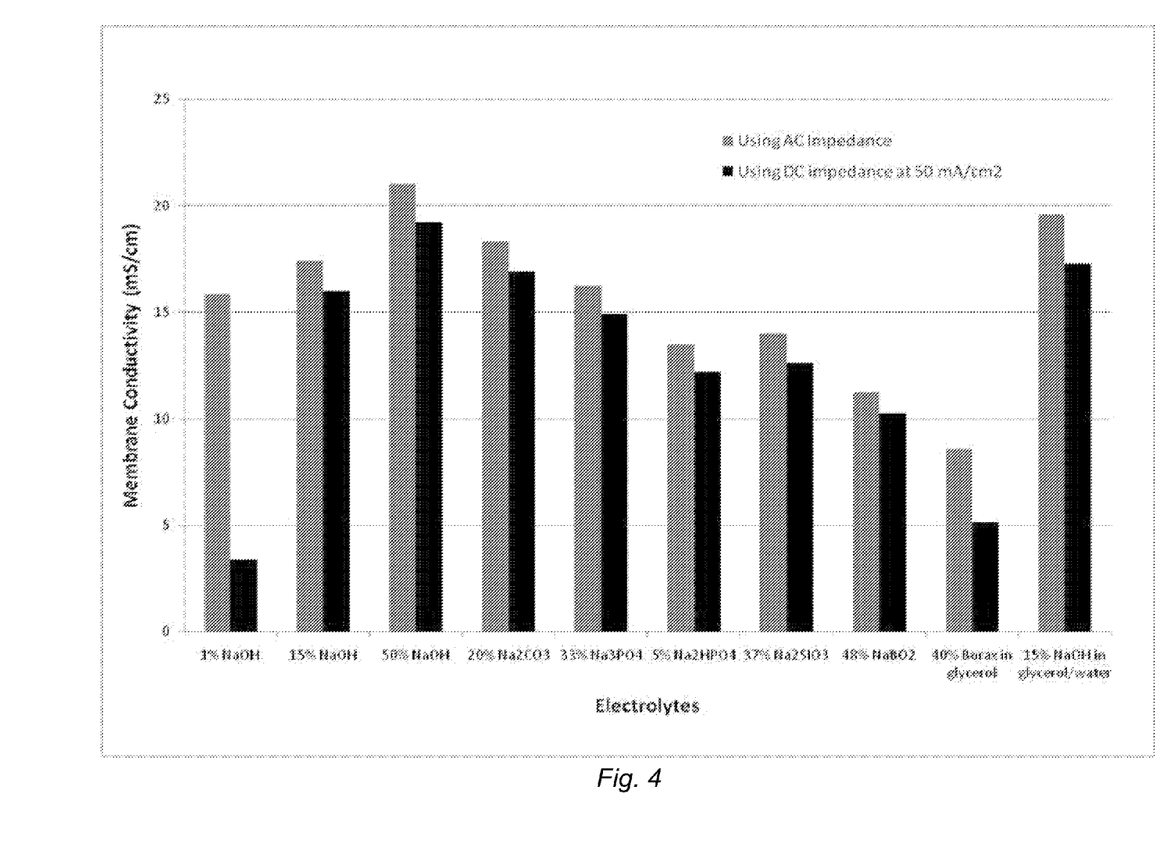
FIG. 4 depicts a graph representing membrane conductivity at 90° C. using a variety of representative embodiments of suitable positive electrolyte solutions.

Moreover, some examples of reactions that may occur during the discharging and charging of a cell in which the positive electrode 35 comprises a nickel oxyhydroxide (NiOOH) electrode, the negative electrode 20 comprises sodium, and the positive electrolyte 40 (as discussed below) comprises an aqueous solution, are shown below:

With respect now to the positive electrolyte solution 40, the positive electrolyte can comprise any suitable sodium ion conductive material that allows the cell 10 to function as intended. Additionally, in some embodiments, the positive electrolyte has a higher sodium ion conductivity than does the electrolyte membrane 45 (described below). By way of non-limiting illustration, FIG. 4 depicts a graph representing the conductivity of a sodium ion conductive electrolyte membrane (e.g., a NaSICON membrane) at 90° C. for a variety of representative embodiments of suitable positive electrolytes. In particular, for each positive electrolyte shown in FIG. 4, FIG. 4 shows the membrane conductivity using AC impedance (e.g., the bar on the left for each positive electrolyte) and DC impedance at 50 mA/cm² (e.g., the bar on the right for each positive electrolyte).

Some examples of suitable materials in the positive electrolyte 40 include, but are not limited to, sodium hydroxide, glycerol, water, borax, sodium tetraborate decahydrate, sodium metaborate tetrahydrate, sodium silicate, boric acid, sodium borohydride, sodium phosphate, sodium hydrogen phosphate, sodium glycerol, sodium carbonate, ethylene, propylene, an ionic liquid (as discussed above), another suitable liquid, and any suitable combination of the foregoing. By way of illustration, in some embodiments, the positive electrolyte 40 comprises one or more of the following solutions: sodium hydroxide and water; sodium hydroxide, borax, and water; glycerol and sodium hydroxide; glycerol, sodium hydroxide, and water; glycerol and borax; sodium tetraborate decahydrate and water; and borax and water.

The various ingredients in the positive electrolyte 40 can have any suitable concentration that allows the cell 10 to function as intended. For instance, in some embodiments, the positive electrolyte comprises from about 0 to about 50% (e.g., between about 4% and about 50%) sodium hydroxide, by weight; from about 0 to about 96% glycerol, by weight; from about 0 to about 45% borax, by weight; from about 0 to about 60% sodium tetraborate decahydrate, by weight (e.g., between about 40% and about 60%); and from about 0 to about 93% water, by weight. By way of non-limiting illustration, Table 2 (shown below) provides some non-limiting examples of suitable positive electrolyte solutions.

TABLE 2

| Positive electrolyte Solutions |
|---|
| 50% Sodium Hydroxide and 50% Water (filler) |
| 15% Sodium Hydroxide, 28% Glycerol, and 57% Water (filler) |
| 4% Sodium Hydroxide and 96% Glycerol (filler) |
| 4% Sodium Hydroxide, 16% Water, and 80% Glycerol (filler) |
| 45% Borax and 55% Glycerol (filler) |
| 40% Borax and 60% Water (filler) |
| 7.5% Sodium Hydroxide and 92.5% Water (filler) |
| 35% Sodium Hydroxide and 65% Water (filler) |
| 15% Sodium Hydroxide and 85% Water (filler) |
| 15% Sodium Hydroxide 28% Borax, and 57% Water (filler) |
| 25% Sodium Hydroxide and 75% Water (filler) |
| 25% Sodium Hydroxide, 28% Borax, and 47% Water (filler) |
| 50% Sodium Tetraborate Decahydrate, and 50% Water (filler) |

While the positive electrolyte solutions 40 in Table 2 are shown to have specific concentrations, in other embodiments, the concentrations of the sodium hydroxide, borax, sodium tetraborate decahydrate, and/or glycerol in such solutions can each be modified by ±10%, by weight, and the concentration of the water or glycerol filler can be changed accordingly.

As previously mentioned, the cell 10 comprises a sodium ion selective electrolyte membrane 45 (or primary electrolyte). In this regard, the membrane is selective to the transport of sodium ions and provides a permeation barrier between the negative electrolyte 25 and positive electrolyte 40 liquids. Thus, the negative electrolyte and positive electrolyte liquids need not be the same. Additionally, a distinguishing feature between the electrolyte membrane (primary electrolyte) and the negative electrolyte (or secondary electrolyte) is that the electrolyte membrane selectively conducts sodium ions, whereas, the negative electrolyte, which also conducts sodium ions, may also conduct any assortment of other cations, anions, and electrons.

The sodium ion conductive electrolyte membrane 45 can comprise any suitable material that selectively transports sodium ions and permits the cell 10 to function with a non-aqueous positive electrolyte or an aqueous positive electrolyte. In some embodiments, the electrolyte membrane comprises a NaSICON-type (sodium Super Ion CONductive) material. In such embodiments, the NaSICON-type material may comprise any known or novel NaSICON-type material that is suitable for use with the described cell 10. Some suitable examples of NaSICON-type compositions include, but are not limited to, $Na_3Zr_2Si_2PO_{12}$, $Na_{1+x}Si_xZr_2P_{3-x}O_{12}$ (where x is selected from 1.6 to 2.4), Y-doped NaSICON ($Na_{1+x+y}Zr_{2-y}Y_ySi_xP_{3-x}O_{12}$, $Na_{1+x}Zr_{2-y}Y_ySi_xP_{3-x}O_{12-y}$ (where x=2, y=0.12), and Fe-doped NaSICON ($Na_3Zr_{2/3}Fe_{4/3}P_3O_{12}$). Indeed, in certain embodiments, the NaSICON-type membrane comprises $Na_3Si_2Zr_2PO_{12}$. In still other embodiments, the NaSICON-type membrane comprises a known or novel composite, cermet-supported NaSICON membrane. In such embodiments, the composite NaSICON membrane can comprise any suitable component, including, without limitation, a porous NaSICON-cermet layer that comprises NiO/NaSICON or any other suitable cermet layer, and a dense NaSICON layer. In yet other embodiments, the NaSICON membrane comprises a monoclinic ceramic.

Where the cell's electrolyte membrane 45 comprises a NaSICON-type material, the NaSICON-type material may provide the cell 10 with several beneficial characteristics. In one example, because NaSICON-type materials, as opposed to a sodium β"-alumina ceramic electrolyte separator, are substantially impermeable to water, NaSICON-type materials can allow the cell to include a positive electrolyte, such as an aqueous positive electrolyte, that would otherwise be incompatible with the sodium negative electrode 20. Thus, the use of a NaSICON-type membrane as the electrolyte membrane can allow the cell to have a wide range of battery chemistries. As another example of a beneficial characteristic that can be associated with NaSICON-type membranes, because such membranes selectively transport sodium ions but do not allow the negative electrolyte 25 and the positive electrolyte 40 to mix, such membranes can help the cell to have minimal capacity fade and to have a relatively stable shelf-life at ambient temperatures.

When the cell 10 is fully charged, the electrolyte membrane 45 may be disposed any suitable distance X (as shown in FIG. 1) away from the from the interface surface 60 of the sodium negative electrode 20. Indeed, in some embodiments, the distance X between the negative electrode and the electrolyte membrane is less than a distance selected from about 100 µm, about 80 µm, about 60 µm, about 50 µm, about 30 µm, and about 20 µm. Indeed, in some embodiments, when the cell is fully charged, the distance X between the negative electrode and the electrolyte membrane is about 50 µm±about 15 µm. In some embodiment, the smaller the distance between the membrane and the electrode the better. It may be desirable to have enough distance to accommodate all the Na ions when the cell 10 is fully charged, and therefore in one embodiment, the distance X will be the smallest at that point in time. However at a fully discharged state the distance will be the greatest because all of the Na will have been transferred to the cathode side, which of course must be able to accommodate the volume change.

With reference now to the terminals 50 and 55 (shown in FIG. 1), the cell 10 can comprise any suitable terminals that are capable of electrically connecting the cell with an external circuit, including without limitation, to one or more cells. In this regard, the terminals can comprise any suitable material and any suitable shape of any suitable size.

In addition to the aforementioned components, the cell 10 can optionally comprise any other suitable component. By way of non-limiting illustration, FIG. 3 shows an embodiment in which the cell 10 optionally comprises a heat management system 85. In such embodiments, the cell can comprise any suitable type of temperature management system that is capable of maintaining the cell within a suitable operating temperature range. Some examples of such temperature management systems include, but are not limited to, a heater, a cooler, one or more temperature sensors, and appropriate temperature control circuitry.

The described cell 10 may function at any suitable operating temperature. In other words, as the cell is discharged and/or recharged, the sodium negative electrode may have any suitable temperature that allows it to remain solid. Indeed, in some embodiments, the cell functions at an operating temperature below about 100° C. In other embodiments, the cell functions at operating temperatures below about 98° C. In still other embodiments, the cell functions at operating temperatures below about 80° C. In still other embodiments, the cell functions at operating temperatures below about 60° C. In yet other embodiments, the cell functions at operating temperatures below about 40° C. In yet other embodiments, the cell functions at operating temperatures below about 30° C. In yet other embodiments, the cell functions at operating temperatures below about 20° C. For instance, in some embodiments, the cell functions at operating temperatures which are about 25° C.±10° C.

In one embodiment, the cell functions at an operating temperature below the melting temperature of sodium. In another embodiment, the cell functions at an operating temperature below the boiling temperature of an aqueous electrolyte in the cell. It will be appreciated by those of skill in the art where the sodium-based electrode is a sodium alloy, the cell may function at an operating temperature below the sodium alloy. Additionally, where the cell is pressurized, the operating temperature of the cell may be higher. In one embodiment the cell may function at a temperature less than or equal to about 120° C. Indeed in some embodiments, the operating temperature of the cell is such that the negative or sodium-based electrode is in solid form.

In addition to the aforementioned advantages and characteristics of the described cell 10, the cell may have several other beneficial characteristics. In one example, the described cell may impede or prevent dendrite growth on the negative electrode 20 as the cell is recharged. Accordingly, the lifespan of the cell may be increased over some conventional sodium-based rechargeable batteries. In another example, the described cell may function at relatively low operating temperatures. As a result, the cell may require little to no energy to heat and/or dissipate heat from the cell as the cell functions. Additionally, because the cell can operate at a lower temperature than certain conventional sodium-based rechargeable batteries, the cell may be less dangerous to use or handle. In still another example, because the cell may be recharged multiple times, does not release hazardous chemicals as it functions, and requires less thermal energy than some conventional batteries, the cell may be relatively environmentally friendly.

The following examples are given to illustrate various embodiments within the scope of the present invention. These are given by way of example only, and it is understood that the following examples are not comprehensive or exhaustive of the many types of embodiments of the present invention that can be prepared in accordance with the present invention.

Example 1

In this example, an embodiment of the solid-state sodium-based secondary cell 10 was fabricated and tested. In this regard, the system included a solid sodium negative electrode 20, a NaSICON electrolyte membrane 45, and an organic negative electrolyte 25. This system further included a sodium ion solution between the sodium metal negative electrode and the NaSICON membrane, thereby removing the $Na^+ + 1e^- \leftrightarrow Na°$ reaction from the NaSICON surfaces and preventing direct contact between the electric conducting sodium and the electrolyte membrane.

A NaSICON tube with a closed end was rough surface ground on a 40 micron grit polishing wheel. The tube dimensions were approximately: 14.7 mm O. D. with a wall thickness of 1.4 mm. A 2.5 cm diameter NaSICON disk, about 1 mm thick, was surface polished to a 0.33 micron surface finish. Both NaSICON parts were dried in-vacuo overnight at about 450° C. and then brought into an argon-filled glove box. The organic electrolyte solution was 1M sodium triflate in dimethoxyethane with benzophenone. The solution was a deep purple color indicating the ketyl free radical was present and the solution was free of water. All tests were performed in an argon-filled glove box.

Figure 5:
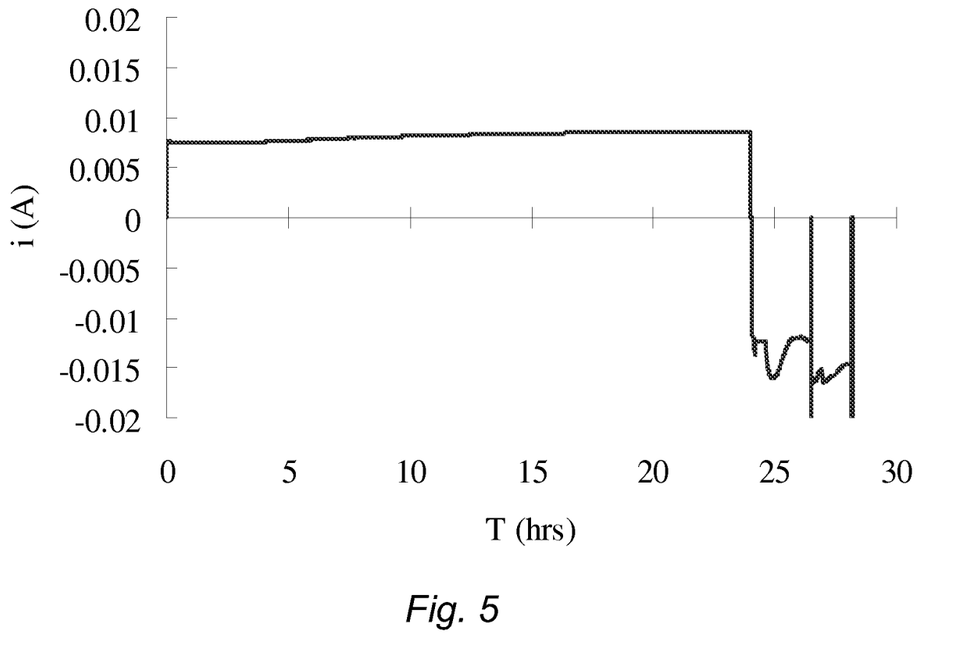
FIG. 5 depicts a computer generated graph illustrating experimental results showing the current response of a representative embodiment of the solid-state sodium-based secondary cell comprising a NaSICON tube and an organic electrolyte solution as the negative electrolyte.

The NaSICON tube was operated at a fixed 0.25V for about 24 hrs and then the voltage was inverted. As a result, the sodium was transferred from the outside to the interior of the tube. The current response measured for this process is shown in FIG. 5. Specifically, FIG. 5 shows that the current began at about 7.3 mA and slowly increased to about 8.5 mA over 24 hrs. The organic electrolyte solution, which is very volatile, was refreshed after about 26 hours. The test was stopped when it was observed that the tube had cracked in the solution/gas/NaSICON interface region. The interior cracked edges of the NaSICON tube were decorated with sodium metal indicating that sodium dendrites penetrated the tube causing failure.

This example demonstrates the feasibility of a solid-state sodium based secondary cell comprising a solid metal sodium negative electrode, a sodium ion conductive ceramic primary electrolyte membrane, and a non-aqueous ionic negative electrolyte solution disposed between the negative electrode and the electrolyte membrane.

Example 2

Figure 6:
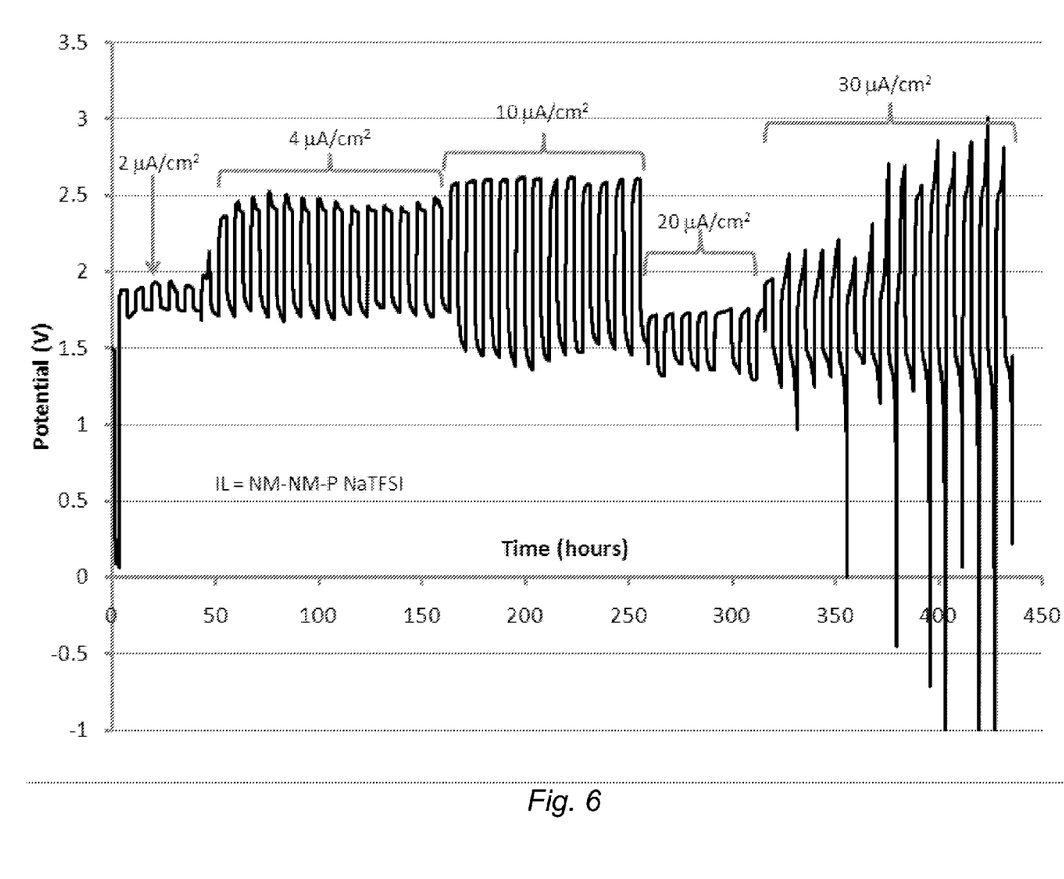
FIGS. 6 and 7 each depict a computer generated graph illustrating experimental results showing the electrical potential measured from a different embodiment of the solid-state sodium-based secondary cell over an extended period of time.
Figure 7:
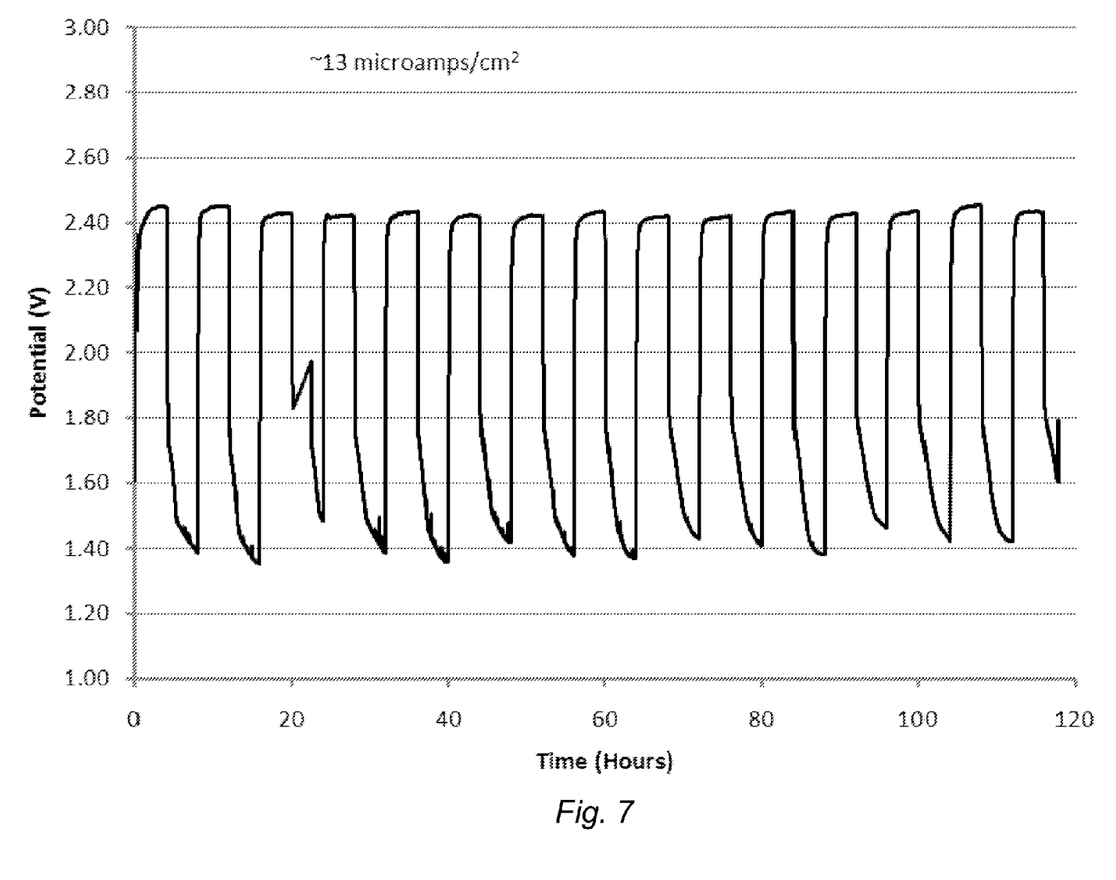

In a second example, FIGS. 6 and 7 show some non-limiting experimental results that indicate the electrical potential measured over an extended period of time from two embodiments of the solid-state sodium-based secondary cell. In this regard, the cells used to obtain the results in both figures comprised a solid sodium metal negative electrode in contact with an ionic liquid. With respect to the ionic liquids used in the cells, the cell used to obtain the results shown in FIG. 6 comprised N-methoxyethyl-N-methyl-pyrrolidinium and sodium bis(trifluoromethane-sulfonyl)imide, and the cell used to obtain the results shown in FIG. 7 comprised propylmethyl-pyrrolidinium and bis(trifluoromethane-sulfonyl) imide. Additionally, the ionic-liquid-containing negative electrolyte in both cells was in contact with a NaSICON membrane. Finally, in both cells, the positive electrode comprised a nickel mesh electrode disposed in a positive electrolyte comprising a about 50% sodium hydroxide solution, by weight.

The experimental results shown in FIGS. 6 and 7 illustrate that embodiments of the described cell are functional for extended periods of time. Indeed, FIG. 6 shows results for a cell that functioned for about 350 hours before the cell began to leak.

While specific embodiments and examples of the present invention have been illustrated and described, numerous modifications come to mind without significantly departing from the spirit of the invention, and the scope of protection is only limited by the scope of the accompanying claims.

The invention claimed is:

1. A sodium-based secondary cell, comprising:
a negative electrode compartment comprising a negative electrode disposed in a non-aqueous, ionic, negative electrolyte solution, wherein the negative electrode electrochemically oxidizes to release sodium ions during discharge and electrochemically reduces sodium ions to sodium metal during charge;
a positive electrode compartment comprising a positive electrode disposed in a positive electrolyte solution; and
a sodium ion conductive electrolyte membrane that separates the negative electrolyte solution from the positive electrolyte solution, and
wherein the negative electrode is solid when the cell functions, wherein the cell functions at an operating temperature below about 100° C.

2. The secondary cell of claim 1, wherein the cell functions when the operating temperature is below about 60° C.

3. The secondary cell of claim 1, wherein the cell functions when the operating temperature is about 25° C.±10° C.

4. The secondary cell of claim 1, wherein the electrolyte membrane comprises a NaSICON-type material.

5. The secondary cell of claim 1, wherein the negative electrolyte solution comprises an organic cation and an inorganic anion that are each chemically stable in the presence of sodium metal, sodium ions, and the electrolyte membrane.

6. The secondary cell of claim 5, wherein the negative electrolyte solution comprises an asymmetric organic cation.

7. The secondary cell of claim 1, wherein the negative electrolyte solution comprises a cation selected from N-methoxyethyl-N-methyl-pyrrolidinium, butylmethyl-pyrrolidinium, propylmethyl-pyrrolidinium, triethyl-sulfonium, diethylmethylsulfonium, ethyl-dimethyl-ammonio-(trimethylammonio)-dihydroborate, pyridinium, pyrrolidinium, quaternary ammonium, quaternary phosphonium, trisulfonium, and sulfonium.

8. The secondary cell of claim 1, wherein the ionic negative electrolyte solution comprises an anion selected from aluminum trichloride hexafluorophosphate, tetrafluoroborate, trifluouromethylsulfonate, bis(trifluoromethane-sulfonyl) imide.

9. A sodium-based secondary cell, comprising:
a negative electrode compartment comprising a negative electrode disposed in a non-aqueous, ionic, negative electrolyte solution, wherein the negative electrode electrochemically oxidizes to release sodium ions during discharge and electrochemically reduces sodium ions to sodium metal during charge, wherein the ionic negative electrolyte solution comprises an anion, wherein the anion comprises bis(trifluoromethane-sulfonyl)imide;
a positive electrode compartment comprising a positive electrode disposed in a positive electrolyte solution; and
a sodium ion conductive electrolyte membrane that separates the negative electrolyte solution from the positive electrolyte solution, and
wherein the negative electrode is solid when the cell functions, wherein the cell functions at an operating temperature below about 100° C.

10. The secondary cell of claim 1, wherein the positive electrolyte solution comprises a combination of substances selected from water, sodium hydroxide, sodium silicate, glycerol, borax, sodium metaborate tetrahydrate, sodium tetraborate decahydrate, boric acid, sodium borohydride, sodium borate, sodium phosphate, sodium hydrogen phosphate, sodium glycerol, sodium carbonate, ethylene, and propylene.

11. The secondary cell of claim 1, wherein the negative electrode comprises sodium metal when the secondary cell is at least partially charged.

12. The secondary cell of claim 11, wherein the negative electrode and the electrolyte membrane are separated by a distance of less than about 100 µm when the cell is fully charged.

13. A sodium-based secondary cell, comprising:
a negative electrode compartment comprising a negative electrode disposed in a non-aqueous, ionic, negative electrolyte solution, wherein the negative electrode electrochemically oxidizes to release sodium ions during discharge and electrochemically reduces sodium ions to sodium metal during charge, and wherein the negative electrode comprises sodium metal when the secondary cell is at least partially charged;
a positive electrode compartment comprising a positive electrode disposed in a positive electrolyte solution; and
a NaSICON-type electrolyte membrane that separates the negative electrolyte solution from the positive electrolyte solution; and
wherein the negative electrode is solid when the cell functions, and wherein the cell functions at an operating temperature below about 100° C., and wherein the negative electrode and the electrolyte membrane are separated by a distance of less than about 100 µm when the cell is fully charged.

14. The secondary cell of claim 13, wherein the cell functions when the operating temperature is about 25° C.±10° C.

15. The secondary cell of claim 13, wherein the negative electrolyte solution comprises a cation selected from N-methoxyethyl-N-methyl-pyrrolidinium, butylmethyl-pyrrolidinium, propylmethyl-pyrrolidinium, triethyl-sulfonium, diethylmethylsulfonium, ethyl-dimethyl-ammonio-(trimethylammonio)-dihydroborate, pyridinium, pyrrolidinium, quaternary ammonium, quaternary phosphonium, trisulfonium, and sulfonium.

16. The secondary cell of claim 13, wherein the negative electrolyte solution further comprises an additive selected from a halogenated compound and a sodium salt.

17. The secondary cell of claim 13, wherein the negative electrolyte solution comprises an organic cation and an inorganic anion that are each chemically stable in the presence of sodium metal, sodium ions, and the electrolyte membrane.

18. The secondary cell of claim 16, wherein the halogenated compound is selected from hydrochloric acid, sulfonyl chloride, dichloromethane, carbon tetrachloride, and a salt of a trifluoroacetate ion.

19. The secondary cell of claim 13, wherein the positive electrolyte solution comprises a combination of substances selected from water, sodium hydroxide, sodium silicate, glycerol, borax, sodium metaborate tetrahydrate, sodium tetraborate decahydrate, boric acid, sodium borohydride, sodium borate, sodium phosphate, sodium hydrogen phosphate, sodium glycerol, sodium carbonate, ethylene, and propylene.

20. The secondary cell of claim 13, wherein the electrolyte membrane has a lower ionic conductivity than the negative electrolyte solution.

* * * * *